Oct. 15, 1968   J. P. THOMAS, JR   3,405,631
ROASTING AND SLICING RACK WITH SERVING PLATTER
Filed May 17, 1965
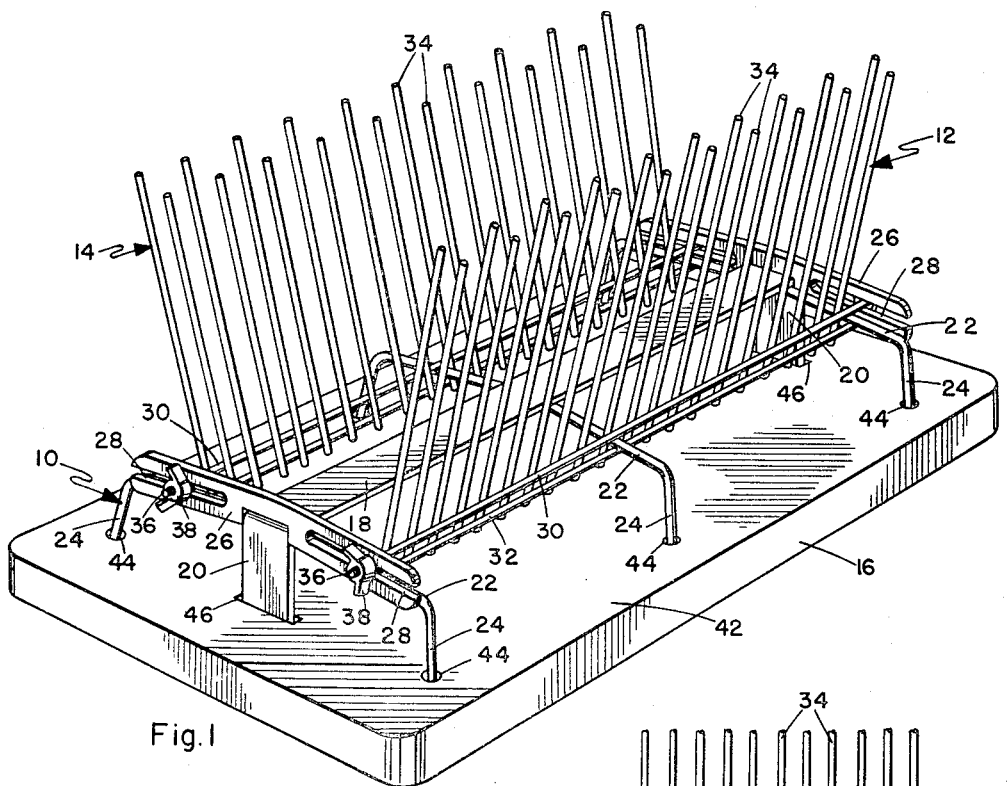
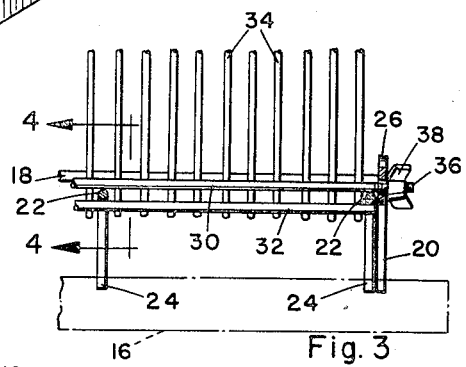
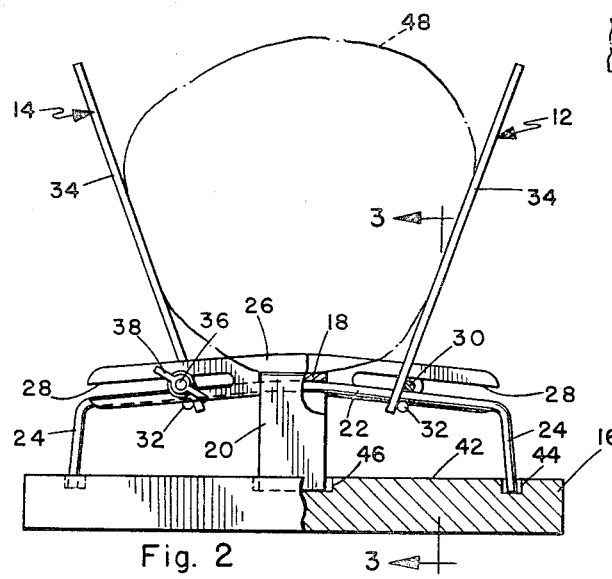
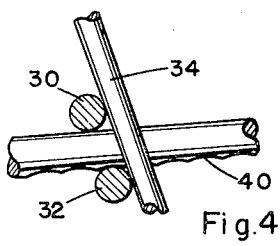
INVENTOR.
JAMES P. THOMAS, JR.
BY
Knox & Knox 3,405,631
ROASTING AND SLICING RACK WITH
SERVING PLATTER
James P. Thomas, Jr., 8200 Parkway Drive,
La Mesa, Calif. 92041
Filed May 17, 1965, Ser. No. 456,201
8 Claims. (Cl. 99—426)

The present invention relates to cooking utensils and more specifically to a roasting and slicing rack with a serving platter.

The primary object of this invention is to provide a rack in which meat can be roasted, then remain in the rack for slicing, the rack having adjustable means to hold any reasonably sized portion of meat and incorporating guides to aid in proper slicing.

Another object of this invention is to provide a rack having a configuration which allows a knife to cut completely through the meat without being obstructed by the rack structure.

Another object of this invention is to provide a roasting and slicing rack designed to fit onto a serving platter which holds the rack against slippage during slicing and facilitates handling of the hot rack and meat, in addition to providing a base which will prevent the rack from damaging a work surface or table top.

A further object of this invention is to provide a roasting and slicing rack which is easily dismantled for cleaning and is equally easily assembled and adjusted to suit various portions of meat.

Another object of this invention is to provide a roasting and slicing rack which is economical to manufacture from a few basic parts of conventional materials, without any special production techniques.

The rack and its structural details are illustrated in the drawing, in which:

FIGURE 1 is a perspective view of the rack on its serving platter;

FIGURE 2 is an end elevation view thereof, partially in section;

FIGURE 3 is a fragmentary sectional view taken on line 3—3 of FIGURE 2, with the platter in broken line; and FIGURE 4 is an enlarged fragmentary sectional view taken on line 4—4 of FIGURE 3.

Similar characters of reference indicate similar or identical elements and portions throughout the specification and throughout the views of the drawing.

The rack assembly comprises a base frame 10 on which are a pair of adjustable grilles 12 and 14, and a substantially flat serving platter 16 on which the base frame rests. Base frame 10 has a longitudinal central spine 18 with downwardly turned end posts 20, the spine being of flat strip material as illustrated, or composed of one or more rods. Fixed to the spine 18 are transverse arch members 22 of rod material, with downwardly turned end portions constituting substantially vertical legs 24, the center of each arch member being higher than the ends. Three arch members are shown, one at each end of spine 18 adjacent the post 20 and one at the center, but any reasonable number may be used. Secured to each end arch member 22 is a transverse end plate 26 having elongated slots 28 inclined downwardly on opposite sides of center and open at their outer ends, said slots being just above and parallel to the adjacent portions of the arch member.

The grilles 12 and 14 each comprise an upper clamp bar 30 and a lower clamp bar 32 in spaced parallel relation, to which are secured a plurality of parallel, substantially inflexible elongated elements 34 which together define the principal portions of the grilles. In the illustrated embodiment these elements 34 are of rod form and are hereinafter referred to as guide rods 34 spaced longitudinally along the clamp bars. The thickness and spacing of the guide rods 34 determines the thickness of slices cut from the meat when a knife is passed down between the rods. The lower ends of the guide rods 34 are fixed to the clamp bars 30 and 32 and hold the two in their parallel relation, the guide rods extending upwardly, perpendicular to the clamp bars. The spacing between the clamp bars is just sufficient for the arch members 22 to slide through, so that the grille can be slidably adjusted along the arch members. Both ends of the upper clamp bar 30 have threaded extensions 36 which project through slots 28 and are secured by wing nuts 38, or similar means, on the outside of end plates 26. When the grille is leaning outwardly the clamp bars 30 and 32 will grip the arch members 22 with a binding action and hold the grille in any position while the wing nuts 38 are tightened. To ensure positive positioning and prevent slippage of the grille while in use, as when slicing meat, the underside of each arch member 22 may be indented or serrated, as at 40 in FIGURE 4, to provide seating for the lower clamp bar 32.

Grille 14 is identical to grille 12 and is merely reversed to fit over the arch members on the other side of spine 18. To facilitate cutting of more or less uniform parallel slices the guide rods 34 are alternately short and long by a small but easily discernible amount. The corresponding guide rods on the two grilles can then be readily identified for placing the knife.

Platter 16 is of wood or other similar material and may be of simple rectangular form as illustrated, or decoratively designed in any suitable manner. The top surface 42 is provided with sockets 44 spaced to receive the legs 24 and slots 46 for the end posts 20.

The grilles 12 and 14 are adjusted to fit the particular portion of meat, indicated in broken line at 48 in FIGURE 2, sufficiently closely to hold the meat against slippage. When the meat is cooked it is left in the rack and placed on the serving platter 16, which then facilitates handling of the hot rack and meat. The platter also protects any surface on which the rack is placed and catches juices dripping from the meat.

The arched configuration of the rack raises the meat, which rests primarily on the spine 18, above the level of the clamp bars 30 on the grilles. Thus the knife can pass completely through the meat without striking the clamp bars and damaging the cutting edge. By loosening wing nuts 38 the grilles can be slid out until the threaded extensions 36 are clear of the open ended slots 28, then turned down and pulled off the legs 24. Thus dismantled into its three basic parts the rack is easily cleaned. The structure is primarily of stock rod or wire material and is assembled by simple welding, or other bonding means which will withstand cooking temperatures.

It is understood that minor variation from the form of the invention disclosed herein may be made without departure from the spirit and scope of the invention, and that the specification and drawings are to be considered as merely illustrative rather than limiting.

I claim:
1. A roasting and slicing rack, comprising:
   a base frame having a plurality of rigid rod-like transverse supporting members having downwardly extending terminal portions constituting substantially vertical legs;
   a substantially central longitudinal spine fixed to and interconnecting said members in spaced relation;
   a pair of grilles slidably adjustably mounted on said members on opposite sides of said spine, said grilles having upwardly extending, parallel elongated elements regularly spaced longitudinally of said spine; and said grilles having clamp bars extending longitudinally above and below said members therebetween;

means for positively securing said grilles at selected positions.

2. A roasting and slicing rack according to claim 1 wherein said clamp bars define openings through which said transverse members extend, said openings being sized and oriented so that said lower edge portions bind and lock upon said transverse members when the grilles are inclined away from each other; a substantially flat serving platter having sockets into which said legs are vertically inserted for removably holding said rock on said platter.

3. A roasting and slicing rack, comprising:
   a base frame having a plurality of upwardly arched transverse supporting members having downwardly extending legs;
   a substantially central longitudinal spine fixed to and interconnecting said members in spaced relation;
   a pair of grilles slidably adjustably mounted on said members on opposite sides of said spine, said grilles having upwardly extending, parallel elongated elements regularly spaced longitudinally of said spine; and
   means to secure said grilles at selected positions;
   said elongated elements being alternately of different lengths in corresponding arrangement on the two grilles.

4. A roasting and slicing rack according to claim 1 and including a substantially flat platter having sockets upwardly open to receive said legs and to hold said rack in place.

5. A roasting and slicing rack, comprising:
   a base frame having a plurality of upwardly arched transverse supporting members having downwardly extending legs;
   a substantially central longitudinal spine fixed to and interconnecting said members in spaced relation;
   said spine having downwardly extending end posts;
   a pair of grilles slidably adjustably mounted on said members on opposite sides of said spine;
   said grilles having clamp bars extending longitudinally above and below said members to grip the members therebetween, and a plurality of upwardly extending, longitudinally spaced, parallel guide rods fixed to said clamp bars; and
   means to secure said grilles at selected positions.

6. A roasting and slicing rack according to claim 5 and including a substantially flat platter having sockets to receive said legs and said end posts to hold said rack in place.

7. A roasting and slicing rack according to claim 5, wherein said means to secure includes end plates fixed to the ends of said base frame, said end plates having open ended slots extending on opposite sides of said spine parallel to adjacent portions of said members;
   one of said clamp bars having end portions extending through said slots; and
   clamp means on said end portions engaging said end plates.

8. A roasting and slicing rack according to claim 5, wherein said spine is disposed above said clamp bars by the arch of said members.

References Cited

UNITED STATES PATENTS

| | | | |
|---|---|---|---|
| 691,833 | 1/1902 | Williamson | 99—426 |
| 1,083,105 | 12/1913 | Kattenhorn | 129—27 |
| 1,550,138 | 8/1925 | Baker | 99—426 |
| 1,764,235 | 6/1930 | Wilmking | 146—150 |
| 2,144,278 | 1/1939 | Wallace | 99—427 |
| 2,222,089 | 11/1940 | Saffell | 99—426 |
| 2,360,026 | 10/1944 | Wall | 99—426 |
| 2,503,795 | 4/1950 | Brown | 99—426 |
| 2,520,389 | 8/1950 | Ferris | 99—449 |

FOREIGN PATENTS 453,795  4/1913  France.

WILLIAM I. PRICE, *Primary Examiner.*

J. M. NEARY, *Assistant Examiner.*